United States Patent
Kashiwaguchi

[11] Patent Number: 5,941,797
[45] Date of Patent: Aug. 24, 1999

[54] DATA-USING GAME SYSTEM

[75] Inventor: Yukihiro Kashiwaguchi, Tokyo, Japan

[73] Assignee: Sega Enterprises, Ltd., Tokyo, Japan

[21] Appl. No.: 09/058,813

[22] Filed: Apr. 13, 1998

Related U.S. Application Data

[63] Continuation of application No. 08/640,042, Apr. 30, 1996.

[30] Foreign Application Priority Data

May 2, 1995 [JP] Japan ................................. 7-108857

[51] Int. Cl.$^6$ .................................................. A63B 24/00
[52] U.S. Cl. .................................. 482/4; 482/8; 482/902; 434/247
[58] Field of Search ............................ 482/1–9, 900–902, 482/51, 57, 63; 434/247; 601/23

[56] References Cited

U.S. PATENT DOCUMENTS

| | | |
|---|---|---|
| 4,408,613 | 10/1983 | Relyea ................................. 482/63 X |
| 4,639,225 | 1/1987 | Washizuka . |
| 4,907,795 | 3/1990 | Shaw et al. ................................ 482/9 |
| 5,230,673 | 7/1993 | Maeyama et al. .................. 482/902 X |

*Primary Examiner*—Glenn E. Richman
*Attorney, Agent, or Firm*—Dickstein, Shapiro, Morin & Oshinsky, LLP

[57] ABSTRACT

A data-using game system 10 comprises data forming devices 11, 12 and 13 which form operational data based on results of operation by an operator, a data card 16 in which the operational data formed by the data forming device are written, and game devices 14 and 15 which read the operational data from the data card to reflect the operational data on game play of the game devices 14 and 15. The data-using game system 10 enables the operator of the system to positively participate in both games and physical training by using operational data that the operator has obtained.

6 Claims, 5 Drawing Sheets

DATA-USING GAME SYSTEM

This application is a continuation of Ser. No. 08/640,042, filed Apr. 30, 1996.

BACKGROUND OF THE INVENTION

The present invention relates to a data-using game system which enables game play data, given by the game device, and data of measured physical strength, etc., given by a physical strength measuring apparatus to be used in the game device.

Amusement facilities equipped with various game devices have been conventionally popular.

A game device which is especially popular among such various game devices is, e.g., a fighting match game. In a fighting match game, a player of the game plays the role of one fighter on the screen of the game and fights with the other fighters on the game screen. A fighting match game is carried on based on a game program which has been inputted in advance in a game device. Thus the fighting match game is carried in the same pattern unless the game program is replaced. Accordingly respective fighters have preset fighting techniques, etc.

A fighting match game is played in the same pattern, and the repeated play of the game bores the players. This is a disadvantage of the fighting match games.

In the fighting match game, an operator with low game playing ability always loses the game. As a result, the operator dose not enjoy the fighting match game. This is another disadvantage of the fighting match games.

Accompanying a stronger inclination for health, sports centers, etc. equipped with a number of various physical strength measuring apparatuses are becoming popular.

The physical strength measuring apparatuses are exemplified by running machines by which running abilities are measured by running tracks which are moved in one direction, etc. The measured values vary depending on runners' abilities and running ways.

However, the operator sometimes loses interest in the physical training by the physical strength measuring apparatus, thereby he can not continue to do the physical training for long time. This is a disadvantage of the physical training measuring apparatuses.

To solve the above disadvantages of the fighting match games and the physical training, the present inventor came up with the idea that data of measured physical strength values which an operator of a fighting match game has obtained by running a running machine are used in the fighting match games, whereby the player can enjoy positive participation in both the physical training and the fighting match games.

One object of the present invention is to provide a data-using game system which enables an operator of the system to positively participate in the physical training by using operational data that the operator has obtained.

Another object of the present invention is to provide a data-using game system which enables an operator of the system to positively participate in a game by using operational data that the operator has obtained.

Another object of the present invention is to provide a data-using game system which enables an operator with low game playing ability enjoy the game play by using the operational data to increase his game playing ability.

Another object of the present invention is to provide a data forming device for forming data for use in the data-using game system.

Another object of the present invention is to provide a data reflecting device for use in the data-using game system.

Another object of the present invention is to provide a data storage device for use in the data-using game system.

The object is achieved by a data-using game system comprising: a data forming device which forms operational data based on results of operation by an operator; a data storage device in which the operational data formed by the first device are written; and a data reflecting device which reads the operational data from the data storage device to reflect the operational data on play by the operator.

In the above-described data-using game system, it is preferable that the data forming device is a physical training device which forms the operational data based on physical strength of the operator; and that the data reflecting device is a game device which reflects the operational data on game play.

In the above-described data-using game system, it is preferable that the game device reflects the operational data on an attribute of a character in the game play.

In the above-described data-using game system, it is preferable that the data forming device is a game device which forms the operational data based on game playing ability of the operator; and that the data reflecting device is a game device which reflects the operational data on game play.

In the above described data-using game system, it is preferable that the data forming device is a game device which forms the operational data based on game playing ability of the operator; and that the data reflecting device is a physical training device which reflects the operational data on physical training level.

In the above described data-using game system, it is preferable that the data forming device is a physical training device which forms the operational data based on physical strength of the operator; and that the data reflecting device is a physical training device which reflects the operational data on physical training level.

The object is achieved by a data forming device for use in the data-using game system, the data forming device being for forming the operational data based on physical strength of the operator.

The object is achieved by a data forming device for use in the data-using game system, the data forming device being for forming the operational data based on game playing ability of the operator.

The object is achieved by a data reflecting device for use in the data-using game system, the data reflecting device being for reflecting the operational data on game play.

The object is achieved by a data reflecting device for use in the data-using game system, the data reflecting device being for reflecting the operational data on physical training level.

The object is achieved by a data storage device for use in the data-using game system, the data storage device being for storing the operational data.

In the above described data storage device, it is preferable that the data storage device stores identification data of the operator.

In the above described data storage device, it is preferable that the data storage device stores is an ID card.

DETAILED DESCRIPTION OF THE INVENTION

The data-using game system according to one embodiment of the present invention will be explained with reference to FIGS. 1 to 5.

Figure 1:
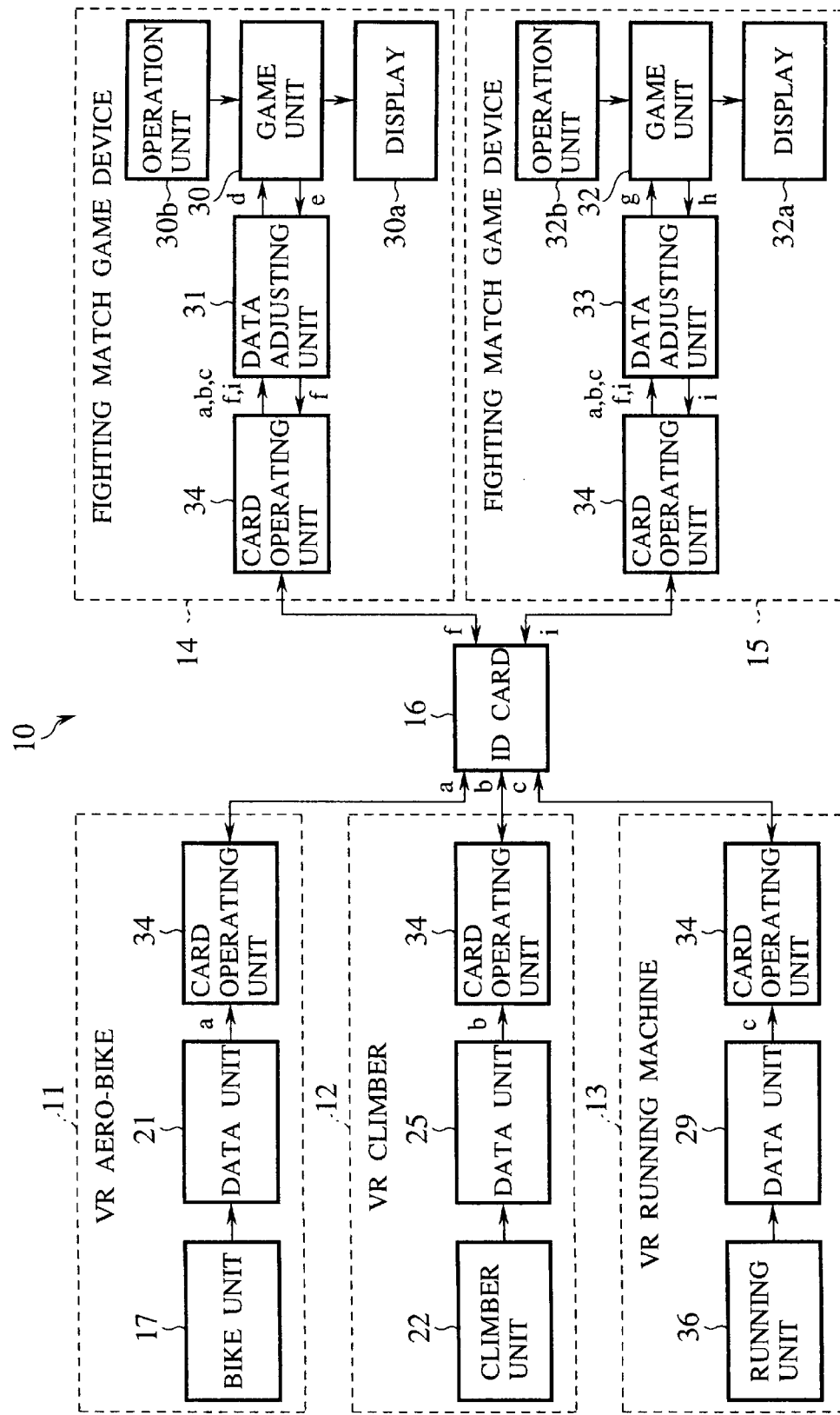
FIG. 1 is a block diagram of the data-using game system according to one embodiment of the present invention, which shows its general structure.

As shown in FIG. 1, the data-using game system 10 comprises three data forming devices, a VR aero-bike 11, a VR climber 12 and a VR running machine 13, and two fighting match game devices 14, 15. A player who plays a game on the data-using game system 10 is provided with his own data card, an ID card 16.

Figure 2:
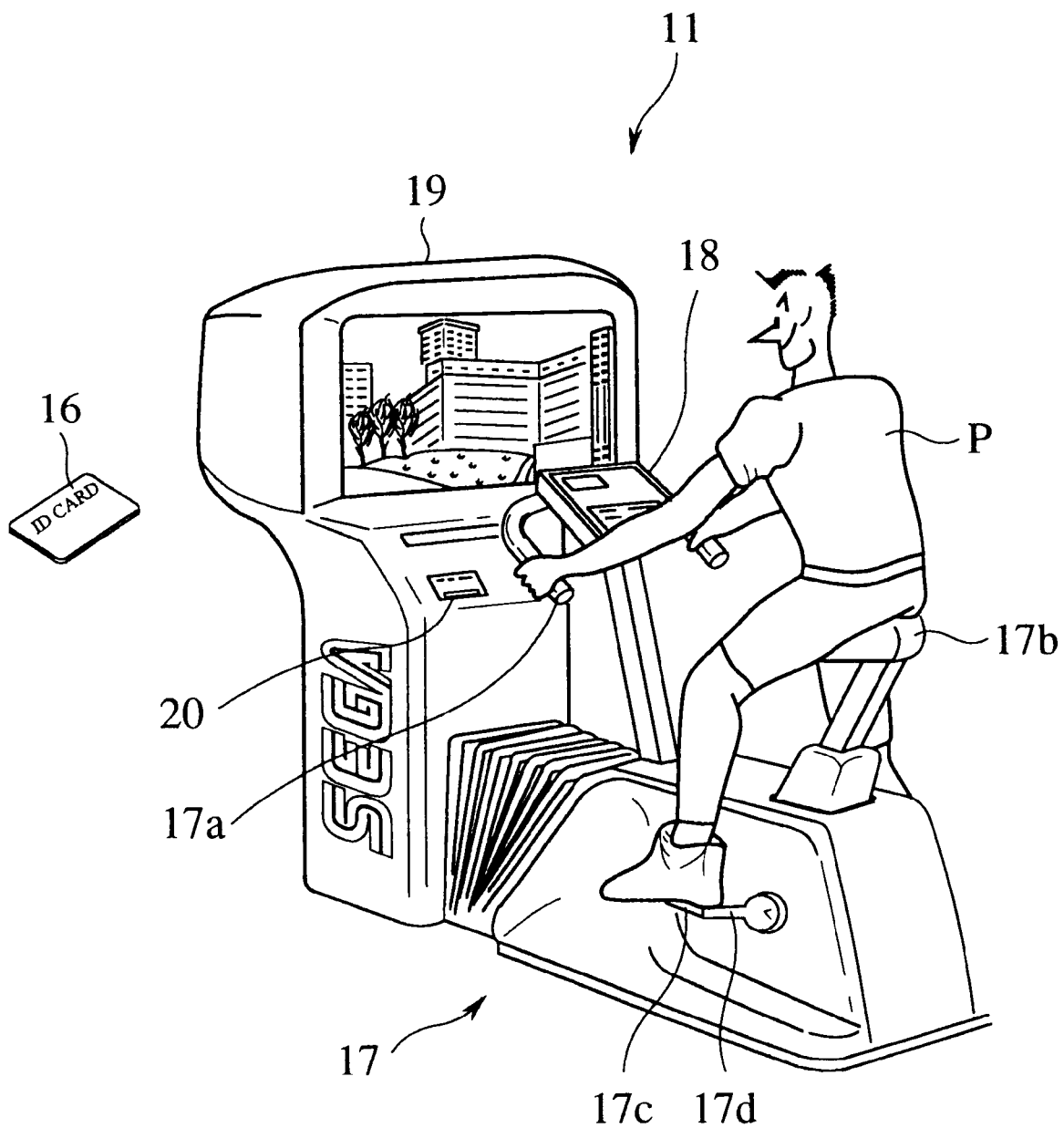
FIG. 2 is a view of the operational state of the VR aero-bike of the data-using game system according to the embodiment of the present invention.

As shown in FIG. 2, the VR aero-bike 11 includes a bike unit 17, and a data display unit 18 and an image display unit 19 disposed in front of the bike unit 17. The bike unit 17 includes a handle 17a, a saddle 17b, and a pair of cranks 17d (one of them shown) with pedals 17c. The data display unit 18 is disposed on the handle 17a. Below the image display unit 19 there is formed a card slot 20 for the ID card 16 to be inserted into.

When a player P sits on the saddle 17b holding the handle 17a, and rotates the pedals 17c with his feet, the cranks 17d are rotated. The load for rotating the cranks 17d can be optionally selected. For example, when a biking state is set at an inclining slope, a large load is applied to rotations of the cranks 17d, and the player P requires a large force to rotate the pedals 17c.

In the data display unit 18, a biking speed corresponding to a rotation number of the cranks 17d, a total biking distance so far from the start of moving the pedals 17c, etc. are displayed.

In the image display unit 19, sights which are usually seen while riding a bike are displayed (as virtual reality). The sights vary depending on a set biking state. For example, while the bike is going up a slope, the sights make the player P feel like he is riding up the slope. The sight is shifted corresponding to the rotation number of the cranks 17d rotated by stepping on the pedals 17c. When the cranks 17d are slowly rotated, the sight is slowly shifted, and the sight is swiftly shifted when the cranks 17d are quickly rotated.

The player P continues rotating the pedals 17c, seeing sights displayed in the image display unit 19 to measure his physical strength, and he feels as if he were cycling through various places.

The VR aero-bike 11 incorporates a data unit 21 (see FIG. 1).

The data unit 21 receives from the bike unit 17 outputs corresponding to, rotations of the cranks 17d rotated by the player P. Based on the outputs, the data unit 21 forms and records measured physical strength data (a) of endurance of the player P. The measured physical strength data (a) is operational data based on an operational result of operation of the VR aero-bike 11 by the player P and can be computed based on a biking time, a biking distance, riding conditions, etc.

Figure 3:
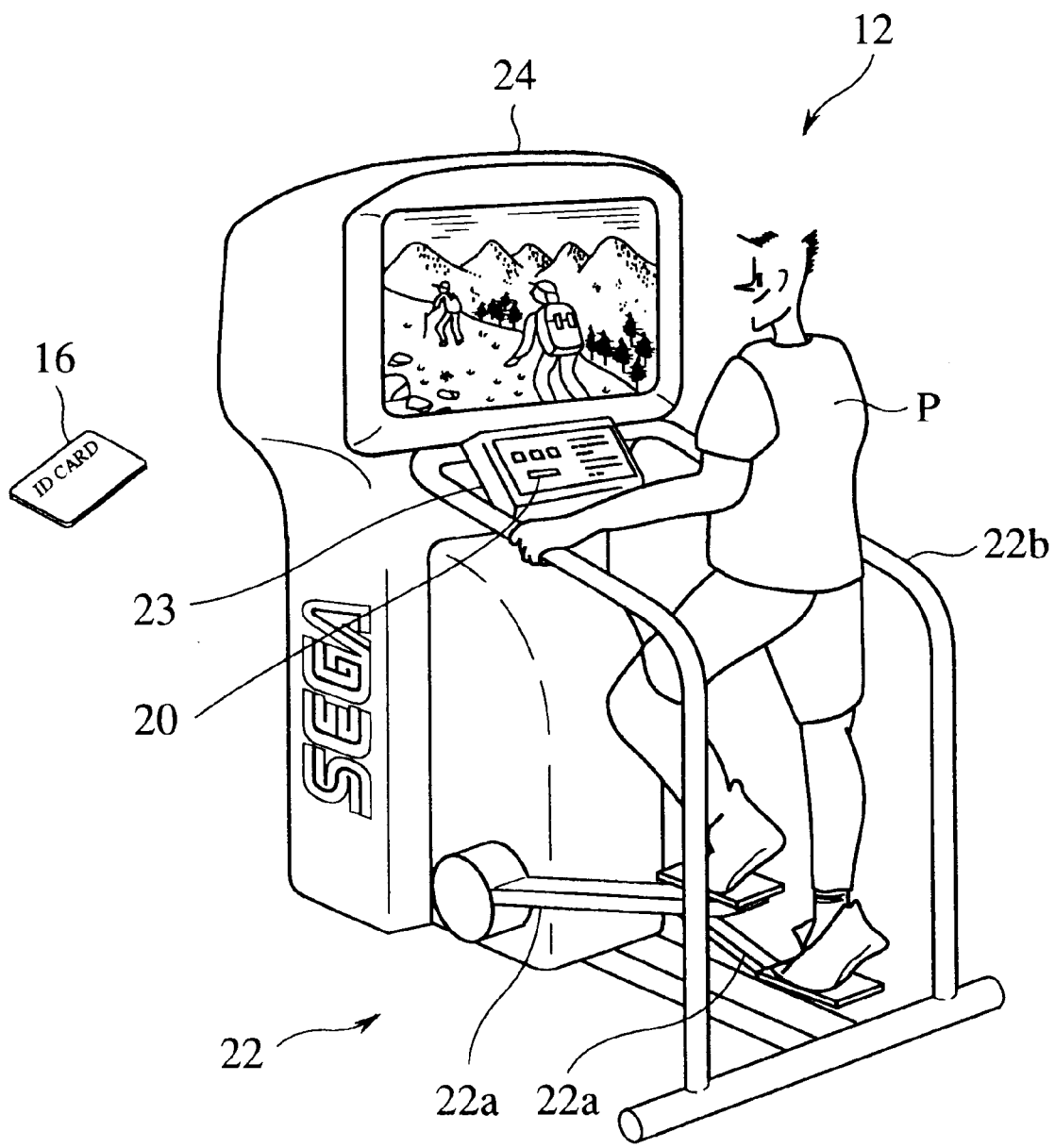
FIG. 3 is a view of the operational state of the VR climber of the data-using game system according to the embodiment of the present invention.

As shown in FIG. 3, the VR climber 12 comprises a climber unit 22, a data display unit 23 mounted on a handrail 22b, and an image display unit 24. The climber unit 22 includes a pair of pedals 22a, 22a to be stepped down by a player P, and the handrail 22b. The pedals 22a, 22a are normally urged upward and can be stepped down against an upward urging force. The data display unit 23 has a card slot 20 for an ID card 16 to be inserted into.

The player P puts his feet on the pedals 22a, 22a, supporting himself by holding the handrail 22b with his hands. The pedals 22a, 22a are alternately stepped down by the player P. The load of pressing down the pedals 22a, 22a can be optionally adjusted. For example, when a climbing trail is set steep, a large load is applied to the pedals 22a, 22a. Accordingly the player P needs a large force to press down the pedals 22a, 22a.

In the display unit 23 a walking speed corresponding to the speed of pressing down the pedals 22a, 22a, a total walking distance so far from the start of stepping down the pedals 22a, 22a, etc. are displayed.

In the image display unit 24 sights which are usually seen while climbing are displayed (as virtual reality). The sights vary depending on a set climbing state. For example, when the climbing trail is steep, the sights make the player P feel like he is climbing up a steep climbing slope. The sight is shifted corresponding to the speed of the player P pressing down the pedals 22a, 22a. When the pedals 22a, 22a are slowly pressed down, the sights are slowly shifted, and the sights are swiftly shifted when the pedals 22a, 22a are quickly pressed down.

The player P continues stepping the pedals 17c, seeing sights displayed in the image display unit 24 to measure his physical strength, and he feels as if he were doing mountain climbing.

The VR climber 12 incorporates a data unit 25 (see FIG. 1).

The data unit 25 receives from the climber unit 22 outputs corresponding to motions of the pedals 22a, 22a stepped down by the player P. Based on the outputs, the data unit 21 forms and records measured physical strength data (b) of the leg strength of the player P. The measured physical strength data (b) is operational data based on an operational result of operation of the VR climber 12 by the player P and can be computed based on a walking time, a walking distance, walking conditions, etc.

Figure 4:
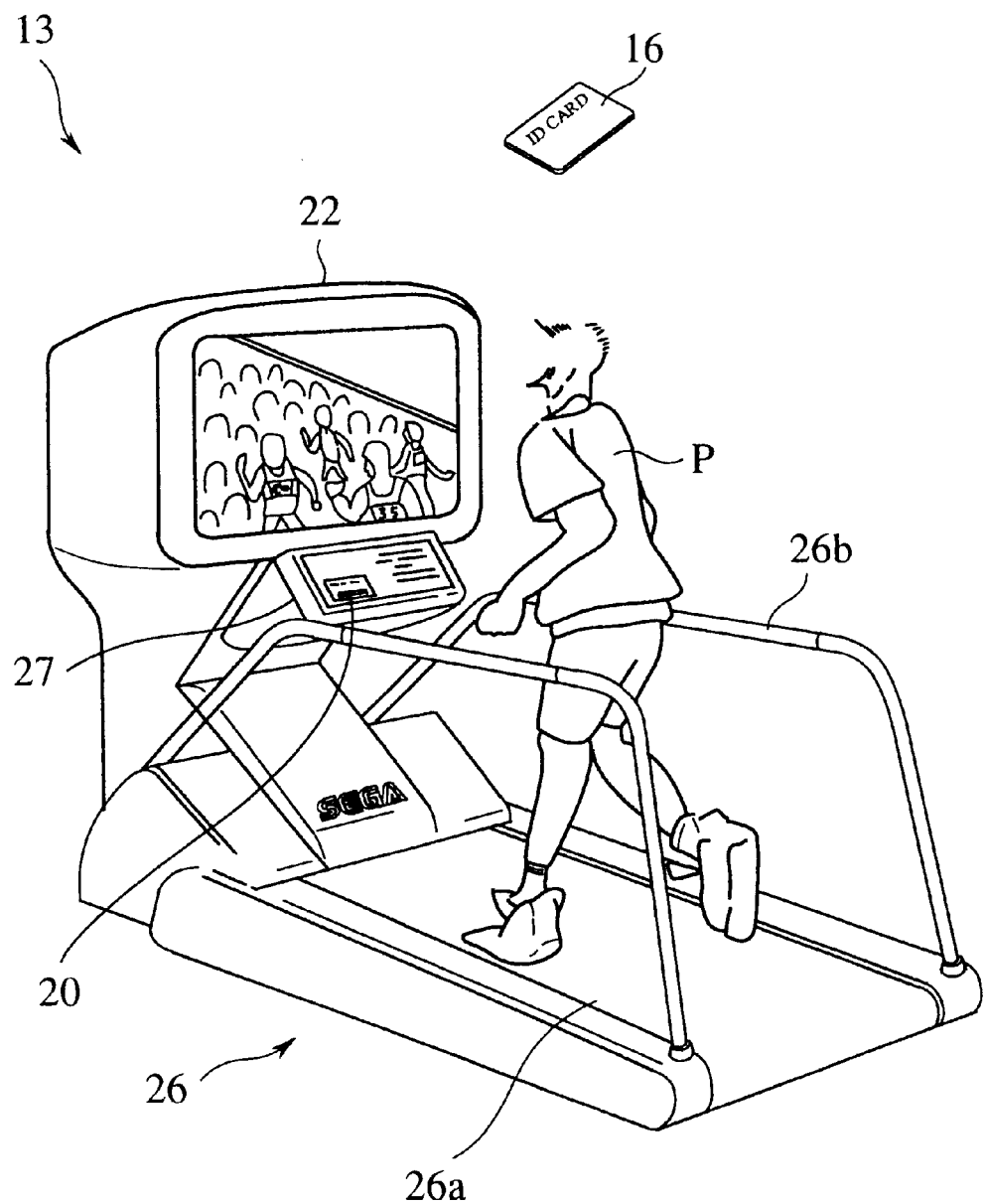
FIG. 4 is a view of the operational state of the VR running machine of the data-using game system according to the embodiment of the present invention.

As shown in FIG. 4, the VR running machine 13 comprises a running track 26a, a running unit 26 with a guardrail 26b, a data display unit 27, and an image display unit disposed in front of the running unit 26. The data display unit 27 is positioned below the image display unit 28. The running track 26a is provided by a rearward moving part of a circulating belt. The player P can run in position on the running track by running in accordance with a moving speed of the running track 26a. A car slot 20 for the ID card 16 to be inserted into is formed in the data display unit 27.

The player P runs in accordance with the rearward moving speed of the running track 26a, and can optionally adjust the running state by changing the rearward moving speed of the running track 26a. When the rearward moving speed of the running track 26a is high, the player P has to increase his running pace in accordance with the rearward moving speed of the running track 26a.

The data display unit 27 displays the running speed of the player P, a total running distance so far from the start of his running, etc.

In the image display unit 28 sights which are usually seen while running are displayed (as virtual reality). The sights vary in accordance with the transient running time. For example, the player P continues running on the running track 26a, seeing the sights displayed on the image display unit 28, and he feels as if he were running on a road.

The VR running machine 13 incorporates a data unit 29 (see FIG. 1).

The data unit 29 receives from the running unit 26 outputs corresponding to running speeds of the player P running on the running track 26a. Based on the outputs, the data unit 21 forms and records measured physical strength data (c) of running power of the player P. The measured physical strength data (c) is operational data based on an operational result of operation of the VR running machine 13 by the player P and can be computed based on a running time, a running distance, running conditions, etc.

The fighting match game device 14 comprises a game unit 30 and a data adjusting unit 31 (see FIG. 1). The fighting match game device 14 has a card slot (not shown) opened in the outside surface thereof.

The game unit 30 records a game program of a fighting match game, and displays the fighting match game on a display 36a, based on the game program. In the fighting match game a player P plays the role of a character player selected out of a plurality of fighters in a game image to fight with the rest fighters in the game image. The player P operates an operation unit 30b, watching the game image to advance the fight by means of various techniques and abilities of the character player.

Based on measured physical strength data (a), (b) and (c) inputted by a card operating unit 34 which will be described later, the data adjusting unit 31 outputs adjustment data (d) to the game unit 30. The adjustment data (d) is for adjusting various techniques and abilities of the character player. When the adjustment data (d) is inputted to the game unit 30 the various techniques and abilities of the character player on the game image are adjusted based on the adjustment data (d). For example, when adjustment data (d) for increasing leg strength is inputted, the jumping power and kicking power of the character player are increased, and when adjustment data (d) for increasing endurance is inputted, a fighting endurance and attacking endurance of the character player are increased. When adjustment data for increasing running power is inputted, the moving speed of the character player is increased.

Game result data (e) from the game unit 30 are inputted to the data adjusting unit 31. The game result data (e) is indicative of a match result between the character player and the rest of the fighters at the time of the end of the game, e.g., a gain or the like the character player has won by defeating the rest of the fighters. When the game result (e) is inputted to the data adjusting unit 31, the data adjusting unit 31 outputs game data (f) to the card operating unit 34. The game data (f) is operational data which is based on an operational result of operation of the fighting match game device 14 by the player P.

The fighting match game device 15 comprises a game unit 32 and a data adjusting unit 33 (see FIG. 1). The fighting match game device 15 has a card slot (not shown) opened in the outside surface thereof.

The game unit 32 records a game program of a fighting match game, and displays the fighting match game on a display 32a, based on the game program. The game unit 32 records a game program which is different from that stored in the game unit 30, and, based on the game program, displays the fighting match game on the display 32a. The player P operates an operational unit 32b, watching a game image to advance the fight by means of various techniques and abilities of the player character.

The game adjusting unit 33 outputs adjustment data (g) to the game unit 32, based on the measured physical strength data (a), (b) and (c) inputted from the card operating unit 34. The adjustment data (g) have the same function as the adjustment data (d) which the data adjustment unit 31 outputs to the game unit 30.

The game unit 32 inputs game result data (h) to the data adjusting unit 33. The game result data (h) have the same function as the game result data (e) which the game unit 30 inputs to the data adjusting unit 31. The data adjusting unit 33 outputs to the card operating unit 34 game data (i) which are operational data based on an operational result of operation of the fighting match game device 15 by the player P.

The fighting match game operated by the fighting match game device 15 has game contents different from that operated by the fighting match game device 14 in, e.g., fighting site, fighters' abilities, fighting ways, etc.

The VR aero-bike 11, VR climber 12, VR running machine 13, fighting match game device 14 and fighting match game device 15 include the respective card operating units 34 (see FIG. 1).

Each card operating unit 34 draws in an ID card 16 inserted into the card slot 20, and writes and reads data into and from the ID card 16. Thereafter the card operating unit 34 pushes the ID card 16 out of the card slot 20.

Figure 5:
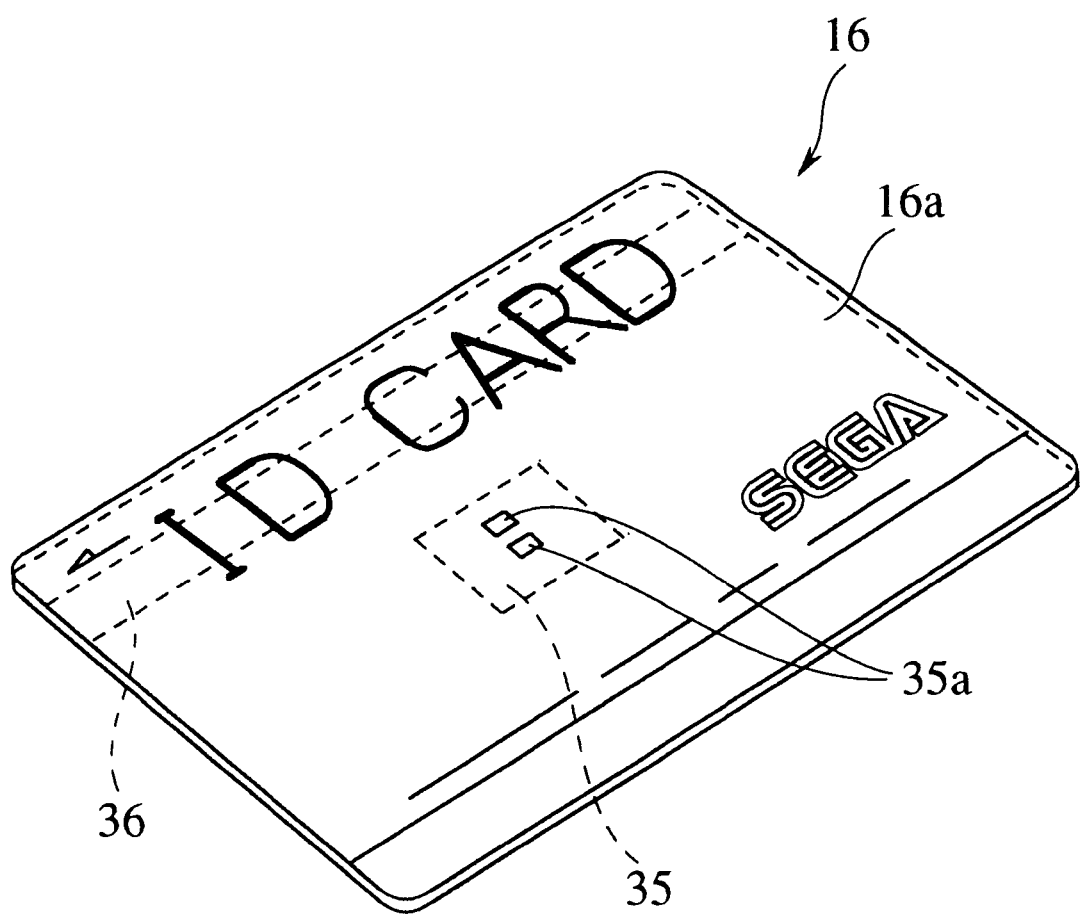
FIG. 5 is a perspective view of an ID card used in the data-using game system according to the embodiment of the present invention.

As shown in FIG. 5, the ID card 16 is provided by an IC card incorporating an IC memory 35 which is a data storing unit. The terminals of the IC memory 35 are exposed on a card surface 16a. The IC memory 35 records the measured physical strength data (a), (b) and (c) and the game data (f) and (i). The ID card 16 can also identify a player P using the ID card 16 by a magnetic memory unit 36 disposed on the backside of the card.

The data writing and reading of the card operating unit 34 from and into the ID card 16 will be explained.

When the card operating unit 34 of the VR aero-bike 11 draws in an ID card 16, the card operating unit 34 writes and records measured physical strength data (a). When the card operating unit 34 of the VR climber 12 draws in an ID card 16, the card operating unit 34 writes and records measured physical strength data (b) in the ID card 16. When the card operating unit 34 draws in an ID card 16, the card operating unit 34 writes and records measured physical strength data (c) in the ID card 16.

When the card operating unit 34 of the fighting match game device 14 draws in an ID card 16, the card operating unit 34 writes and records game data (f) in the ID card 16. The card operating unit 34 reads from the ID card 16 measured physical strength data (a), (b) and (c) recorded in the ID card 16, and game data (f) and (i). Similarly the card operating unit 34 of the fighting match game device 15 draws in an ID card 16, the card operating unit 34 writes and records game data (i) in the ID card 16. The card operating unit 34 reads from the ID card 16 measured physical strength data (a), (b) and (c), and game data (f) and (i) recorded in the ID card 16.

The measured physical strength data (a), (b) and (c), and the game data (f) and (i) are recorded in a unified format.

The card operating unit 34 of the fighting match game device 14 outputs to the data adjusting unit 31 the measured physical strength data (a), (b) and (c), and the game data (f) and (i) the unit 34 has read from the ID card 16. When the data adjusting unit 31 receives the respective data (a), (b), (c), (f) and (i), the data adjusting unit 31 outputs adjustment data (d) to the game unit 30.

Similarly, the card operating unit 34 of the fighting match game device 15 outputs to the data adjusting unit 33 the measured physical strength data (a), (b) and (c), and the game data (f) and (i) the unit 34 has read from the ID card 16. When the respective data (a), (b), (c), (f) and (i) are inputted to the data adjusting unit 33, the data adjusting unit 33 outputs adjustment data (g) to the game unit 32.

Then, the method for playing a game on the data-using game system will be explained.

First, a player P selects either of the fighting match game devices 14 and 15 to play a fighting match game; for example, he is selects the fighting match game device 14.

Subsequently, the game is over, and when a game result is a loss, the player P prepares new measured physical strength data to raise his abilities to challenge again the game. In preparing the new measured physical strength data, the player P selects the necessary one of the VR aero-bike 11, VR climber 12 and VR running machine 13 in consideration of the causes of the loss.

For example, when the character player failed to cope with the enemies' attack and lost, the player P selects the VR aero-bike 11 so as to reinforce the character player's endurance to cope with the enemies' attack. The player P prepares measured physical strength data of endurance by the VR aero-Bike 11.

Similarly, when the character player failed to avoid attack by the enemies and was defeated, the player P selects the VR climber 12 so as to increase a jumping power of the player P to avoid the enemies' attack. The player P prepares measured physical strength data of jumping power by the VR climber 12.

When the character player was not quick enough to attack the enemies and was defeated, the player P selects the VR running machine 13 so as to increase a character player's moving speed to quickly attack the enemies. The player P prepares measured physical strength data (c) of running power by the VR running machine 13.

It is possible that without preparing new measured physical strength data, the player P plays a fighting match game on the fighting match game device 15.

Then, after the player P finishes the operation of the selected physical strength measuring device, he inserts his ID card 16 into the card slot 20 of the selected physical strength measuring device.

In a case, for example, that the player P selects the VR climber 12, he inserts his ID card 16 into the card slot 20. The ID card 16 inserted into the card slot 20 is drawn in by the card operating unit 34, and the measured physical strength data (b) is written in the ID card 16 by the card operating unit 34.

The ID card 16 having the measured physical data (b) written in is pushed out of the card operating unit 34 through the card slot 20.

Subsequently, the player P takes his ID card out of the card slot 20 and inserts the ID card 16 into the fighting match game device 14 through the card slot 20.

The ID card 16 inserted into the card slot 20 is drawn into the card operating unit 34. The card operating unit 34 which has drawn in the ID card 16 reads the measured physical strength data (b) from the ID card 16 and outputs the measured physical strength data (b) to the data adjusting unit 31. When the data adjusting unit 31 receives the measured physical strength data (b), the data adjusting unit 31 outputs adjustment data (d) to the game unit 30. The adjustment data (d) for increasing a leg power is inputted to the game unit 30 of the fighting match game 14, whereby a jumping power and a kicking power of the character player of the fighting match game the player P plays are increased.

Thus, the player P can play the fighting match game of the fighting mach game device 14 through the character player whose jumping power and kicking power were increased. As a result, when the character player is attacked, he can jump to easily avoid the enemies' attack.

The data adjusting unit 31 adjusts contents of the fighting match game in accordance with the inputted measured physical strength data (b) so that the measured physical strength data (b) is reflected on the game play.

When the player P thinks the measured physical strength data (b) is insufficient to increase the jumping power and the kicking power of the character player, or wants to further increase the adjusted jumping power and kicking power, he repeats the operation of the VR climber 12. The player P repeats the operation of the VR climber 12 to obtain the measured physical strength data (b) of a higher value and records the measured physical strength data (b) in his ID card 16.

Similarly, the player P can prepare measured physical strength data (a) of endurance by operating the VR aero-bike 11. The measured physical strength data (a) is outputted to the data adjusting unit 31 of the fighting match game device 14 through his own ID card 16. The measured physical strength data (a) is inputted to the data adjusting unit 31, and the data adjusting unit 31 outputs the adjustment data (d) to the game unit 30, whereby the character player's endurance to attack can be increased.

Thus, the player P can play the fighting match game of the fighting match game device 14 through the character player whose fighting endurance and attacking endurance were increased. As a result, the character player can go on fighting without being easily knocked down.

Similarly, the player P can prepare the measured physical strength data (c) of running power by operating the VR running machine 13. The measured physical strength data (c) is outputted to the data adjusting unit 31 of the fighting match game device 14 through his ID card 16. The measured physical strength data (c) is inputted to the data adjusting unit 31, and the data adjusting unit 31 outputs adjustment data (d) to the gate unit 30, whereby the character player's moving speed is increased.

Thus, the player P can play the fighting match game of the fighting match game device 14 through the character player whose moving speed was increased. As a result, the character player can quickly attack the enemies.

Similarly with the fighting match game device 14, it is possible that the player P outputs the measured physical strength data (a), (b) and (c) to the data adjusting unit 33 of the fighting match game device 15 through his ID card 16. When the respective measured physical strength data (a), (b) and (c) are inputted to the data adjusting unit 33, the data adjusting unit 33 outputs the adjusting data (g) to the game unit 32.

It is also possible to output the adjustment data, based on the game data recorded in the ID card 16. A case of outputting the adjustment data, based on the game data will be explained.

First, after the player P has played the fighting match game of the fighting match game device 14, he inserts his ID card 16 into the card slot 20 of the fighting match game device 14. The ID card 16 is drawn into the card operating unit 34, and the card operating unit 34 records the game data (f) in the ID card 16. The ID card 16 with the game data (f) recorded in is pushed out of the card operating unit 34 through the card slot 20.

At this time, in the ID card 16 is recorded a game play result, e.g., the game data (f) corresponding to, e.g., game result data (e) of a high point.

Then, the player P inserts his ID card 16, which he has taken out of the card slot 20, into the card slot 20 of the fighting match game device 15 to play the fighting match game of the fighting match game device.

The card operating unit 34 reads the game data (f) from the ID card 16 the unit 34 has drawn in, and outputs the game data (f) to the data adjusting unit 33. When the data adjusting unit 33 receives the game data (f), the data adjusting unit 33 outputs to the game unit 32 the adjustment data (g) for increasing, e.g., an attack hitting ratio, based on the game data (f). The adjustment data (g) for increasing an attack hitting ratio is inputted to the game unit 32 so as to increase a hitting ratio of the character player's attacks hitting the enemies.

Thus, the player P can play the fighting match game of the fighting match game device 14 through the play character whose ratio of hitting attacks to the enemies was increased. As a result, the character player can more effectively knock down the enemies.

Similarly, the player P plays the fighting match game of the fighting match game device 15, and can output the game data (i) corresponding to the game result data (h) of a result of the fighting match game to the data adjusting unit 31 of the fighting match game device 14 through his ID card 16. The game data (i) is inputted to the data adjusting unit 31, and the data adjusting unit 31 outputs the adjustment data (d) to the game unit 30 so as to increase the abilities, etc. of the character player, based on the adjustment data (d).

It is possible that the game data (f) provided by a previous operation of the fighting match game device 14 is inputted to the data adjusting unit 31 of the fighting match game device 14 to play the fighting match game of the fighting match game device 14. This is the same with the fighting match game device 15.

As described above, the data are transferred by means of the ID card 16, whereby a player P can reflect measured physical strength data prepared by the VR aero-bike 11, VR climber 12 and VR running machine 13 on the fighting match game as abilities of a fighter, or an attribute of a character player in the game.

That is, the operational data a player P has obtained are used in playing a game through his ID card 16, whereby the operator, the player P can positively participate in the game.

As a result, although a fighting match game is repeated in the same pattern, a player can positively participate in the game, and repeated play of the game does not bore the player.

A player P can be identified by an ID card 16, which allows the player P to move and accumulate the data irrespective of space and time.

According to the present invention, a player P can obtain high game playing ability by doing much physical training. The player P with low game playing ability can enjoy the game play by increasing his game playing ability by using the operational data.

The present invention is not limited to the above-described embodiments and can cover other modifications and variations. For example, the physical strength measuring devices and the fighting match game devices whose data are transferred by the ID cards 16 may be provided in any number. As long as the respective devices have the respective card slots 20 and the respective card operating units 34, the data can be transferred by means of the ID cards 16.

The game devices using the data are not limited to the fighting match game devices 14, 15, and may be matching game devices or game devices which use data in some forms.

The physical strength measuring devices are not limited to the VR aero-bike 11, VR climber 12 and VR running machine 13, and may be devices which can provide measured data which are usable in game devices. For example, they may be devices which can provide data of arm power related to punching power, grasping power related to destruction power, etc.

The physical strength measuring devices may be adjusted, based on measured physical strength data and the game data recorded in an ID card 16. In this case, an operational state of the physical strength measuring devices may be adjusted, based on the measured physical strength data and game data read by the data unit of the physical strength measuring devices by means of the I card 16.

For instance, when a player P operating the VR aero-bike 11 has a high physical strength level, the bike unit 17 is so adjusted that the rotation load of the cranks 17d is increased so as to provide measured physical strength data of higher level. This is the same with the climber unit 22 and the running unit 26.

The ID card 16 may be a cash card or a credit card having a recording unit which records necessary data, and may be any card such as a magnetic card, a memory card, an IC card, as long as the card can record necessary data.

Further, the ID card 16 may be other data storage devices, such as a memory cassette, a floppy disk, as long as the data storage device can record necessary date.

What is claimed is:

1. A data storage device for use in a data-using game system comprising:

a device adapted for insertion into a physical training device and into a game device which does not require physical training; and said device containing storage areas for storing operational data formed by said physical training device and by said game device, said data storage device being adapted to exchange said operational data stored in said storage areas between said physical training device and said game device.

2. A data storage device according to claim 1, wherein said data storage device stores identification data of an operator.

3. A data storage device according to claim 1, wherein said data storage device is an ID card.

4. A data storage device according to claim 1, wherein said operational data is physical strength data of an operator measured by said physical training device.

5. A data storage device according to claim 1, wherein said operational data is game data based on a result of operation of said game device.

6. A data-using game system comprising:

a game device which does not require physical training to form game playing data based on game playing by an operator during game play; and a data storage device to move the game playing data from the game device to a physical training device, said physical training device using the game playing data to control physical training of the operator.

* * * * *